(12) United States Patent
Parra

(10) Patent No.: US 6,346,780 B1
(45) Date of Patent: *Feb. 12, 2002

(54) LOW-VOLTAGE, HIGH-EFFICIENCY FLUORESCENT LIGHTING FOR CANES AND UMBRELLAS

(76) Inventor: Jorge M. Parra, 10721 Skyhawk Dr., New Port Richey, FL (US) 34654

( * ) Notice: Subject to any disclaimer, the term of this patent is extended or adjusted under 35 U.S.C. 154(b) by 0 days.

This patent is subject to a terminal disclaimer.

(21) Appl. No.: 09/641,132

(22) Filed: Aug. 16, 2000

Related U.S. Application Data

(60) Provisional application No. 60/150,826, filed on Aug. 26, 1999.

(51) Int. Cl.⁷ .............................................. G05F 1/100
(52) U.S. Cl. ....................................... 315/291; 315/307
(58) Field of Search ................................. 315/307, 209, 315/324, 254, 209 R, 244; 323/252; 362/219, 222

(56) References Cited

U.S. PATENT DOCUMENTS

| | | | |
|---|---|---|---|
| 4,417,181 A | | 11/1983 | Leale ...................... 315/209 R |
| 4,625,742 A | * | 12/1986 | Phillips ........................ 135/66 |
| 5,065,074 A | * | 11/1991 | Hesketh et al. ......... 315/209 R |
| 5,559,393 A | * | 9/1996 | Hilssen ......................... 315/58 |
| 5,998,941 A | * | 12/1999 | Parra .......................... 315/307 |

* cited by examiner

*Primary Examiner*—Don Wong
*Assistant Examiner*—James Clinger
(74) *Attorney, Agent, or Firm*—Jim Zegeer

(57) ABSTRACT

A cane and umbrella lighting system comprising a tubular shaft incorporating a housing having one or more openings formed in one or more walls thereof, a light-producing gas discharge lamp, a source of a high-frequency square-wave voltage having a pair of output terminals and substantially LC-free circuit connecting high-frequency square wave voltage to the gas discharge means to non-thermionically excite and illuminate the gas discharge lamp means, and thereby illuminate one or more openings.

8 Claims, 3 Drawing Sheets

LOW-VOLTAGE, HIGH-EFFICIENCY FLUORESCENT LIGHTING FOR CANES AND UMBRELLAS

REFERENCE TO RELATED APPLICATIONS

The present application is based on my provisional application Serial No. 60/150,826 filed Aug. 26, 1999 entitled LOW-VOLTAGE, HIGH-EFFICIENCY FLUORESCENT LIGHTING FOR CANES AND UMBRELLAS.

The present invention is related to my application Ser. No. 08/915,696 filed Aug. 21, 1997 entitled LOW-VOLTAGE HIGH EFFICIENCY FLUORESCENT SIGNAGE, PARTICULARLY EXIT SIGN NOW U.S. Pat. No. 5,998,941 which is incorporated herein by reference.

BACKGROUND AND BRIEF DESCRIPTION OF THE INVENTION

The cane in Young U.S. Pat. No. 5,810,466 uses a flashlight in the handle and "Tech 2000" Neon Power supply which uses alkaline batteries. The "Neon" system (which requires 3000 volts) produces a low level of light at a high rate of energy use, and for that reason is normally used as ornamental features in vehicles, license plate frames, undercarriage light, etc.

The present invention uses a non-thermionic (e.g. no heated filaments) high-efficiency, high-frequency, square-wave alternating current fluorescent driver and a 4, 6, or 8-watt standard fluorescent tube—FT4, FT6, FT8. In different levels of darkness and environment, the use of a 6W or 4W is preferred.

The umbrella embodiment will work on the same principle of the "spreader lights" on a sailboat. It makes the sail and boat visible but does not interfere with the operator's night vision.

The object of the invention is to provide a new and improved ballastless, non-thermionic and starterless fluorescent cane and/or umbrella light which works on inducing oscillation on the gas contained in the tube at a frequency which is related to the type of gas to obtain maximum luminosity without the presence of a carrier, consumes little electrical energy (2.6 watts) and which is dimmable without flickering regardless of the level of luminosity and in which the light spectrum is constant.

Another object of the invention is to provide an improved cane and/or umbrella light which is low in cost and low in energy consumption.

The cane or umbrella light of the present invention incorporates a ballast-free, starter-free, non-thermionic conventional fluorescent lamp or tube driven by a high-frequency square wave driver circuit.

Another object of the invention is to provide a non-thermionic, ballast-free, fluorescent lighting system for canes and/or umbrellas.

According to the invention at least one gas discharge lighting lamp or tube (which may be constituted by UV-responsive phosphor-coated envelope confining a gaseous discharge medium at a predetermined pressure between a pair of electrodes) is mounted in cane shaft or umbrella shaft as a housing and non-thermionically driven by a high-frequency square wave power supply and switch in the handle portion. The square wave power supply incorporates a solid state switch which is operated to generate a substantially square wave alternating current wave at the lamp or tube electrodes to start and operate the lamp such that the voltage supplied to the electrodes reverses polarity more rapidly than the pattern of electron and ion density in the tube can shift so that electrons throughout the length of the tube are continually accelerated and will, through several cycles of said square wave, create free electrons and ions throughout the tube's volume, in steady state operation and illuminate the fluorescent lighting lamp. The frequency of oscillation is preferably related to the type of gas to obtain maximum luminosity without the presence of a carrier. The current in the tube is minimal and no noticeable level of RFs are present, that is, there is substantially no radio interference.

The square wave driver circuit in the present invention provides a level of luminosity for the cane or umbrella which is a function of the voltage thereby making dimming of the fluorescent lamp possible without flickering (90% dimming) regardless of the level of luminosity. The band on the spectrum is constant and reflects the initial reaction to the oscillation.

According to one aspect, the invention provides a shaft lighting system for canes and umbrellas comprising, in combination a shaft having one or more openings formed in one or more walls thereof, a fluorescent gas discharge lamp means, a source of a high-frequency square-wave voltage having a pair of output terminals and substantially LC-free circuit connecting said high-frequency square-wave voltage to said fluorescent gas discharge means to non-thermionically excite and illuminate said fluorescent gas discharge lamp means, and thereby illuminate the area surrounding said shaft. The voltage is from about 2 volts to about 90 volts and the frequency is from about 75 kHz to about 4 MHz.

According to another aspect, the invention relates to a cane having a hollow shaft housing with one or more openings thereon, the cane having a lighting system including a fluorescent gas discharge lamp device mounted in said housing, a source of high-frequency, square-wave AC voltage having output terminals and a substantially LC-free circuit connecting said gas discharge lamp device to said output terminals to excite and illuminate sid fluorescent gas discharge lamp device to thereby illuminate said one or more openings.

In another aspect, the invention relates to an umbrella lighting system comprising, in combination a tubular umbrella shaft, a housing having one or more openings formed in one or more walls thereof, a light-producing gas discharge lamp, a source of a high-frequency square-wave voltage having a pair of output terminals and substantially LC-free circuit connecting said low-voltage, high-frequency square wave voltage to said gas discharge means to non-thermionically excite and illuminate said gas discharge lamp means, and thereby illuminate one or more openings. The voltage is from about 2 volts to about 90 volts and the frequency is from about 75 kHz to about 4 MHz. The umbrella has a flexible rain shield and deflector and spreader mechanism, and wherein said light emitted through said one or more openings illuminate said flexible rain shield and deflector from the interior thereof like the spreader lights on a sailboat.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1B:
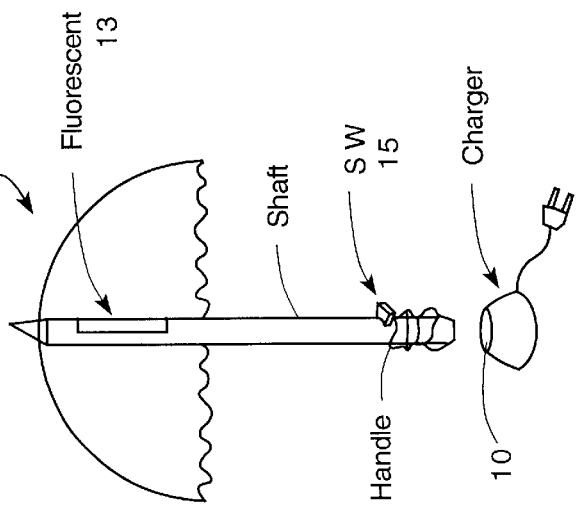
FIG. 1B illustrates an umbrella.
Figure 1A:
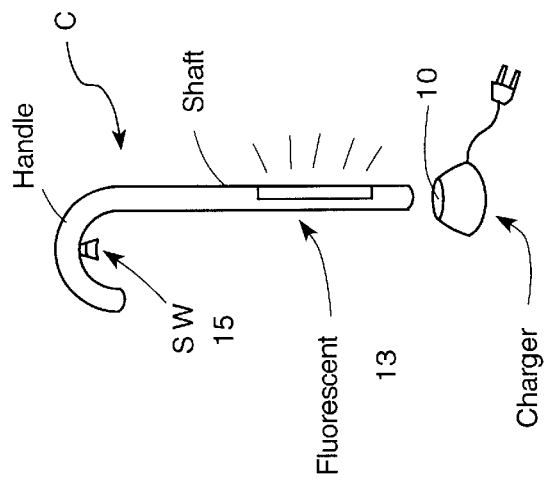
FIG. 1A illustrates a cane embodiment.
Figure 1C:
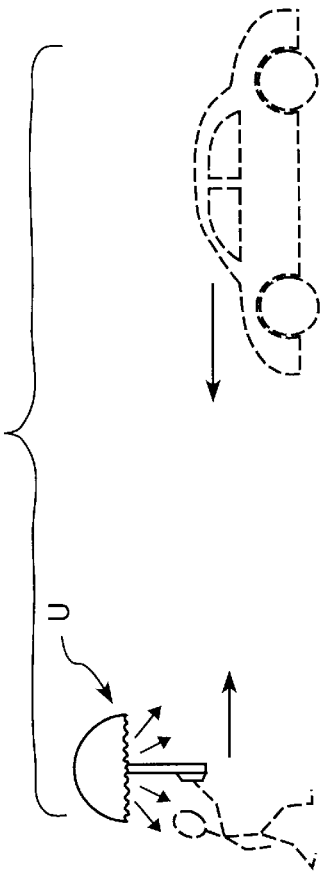
FIG. 1C illustrates the visibility at night of the umbrella embodiment.
Figure 2:
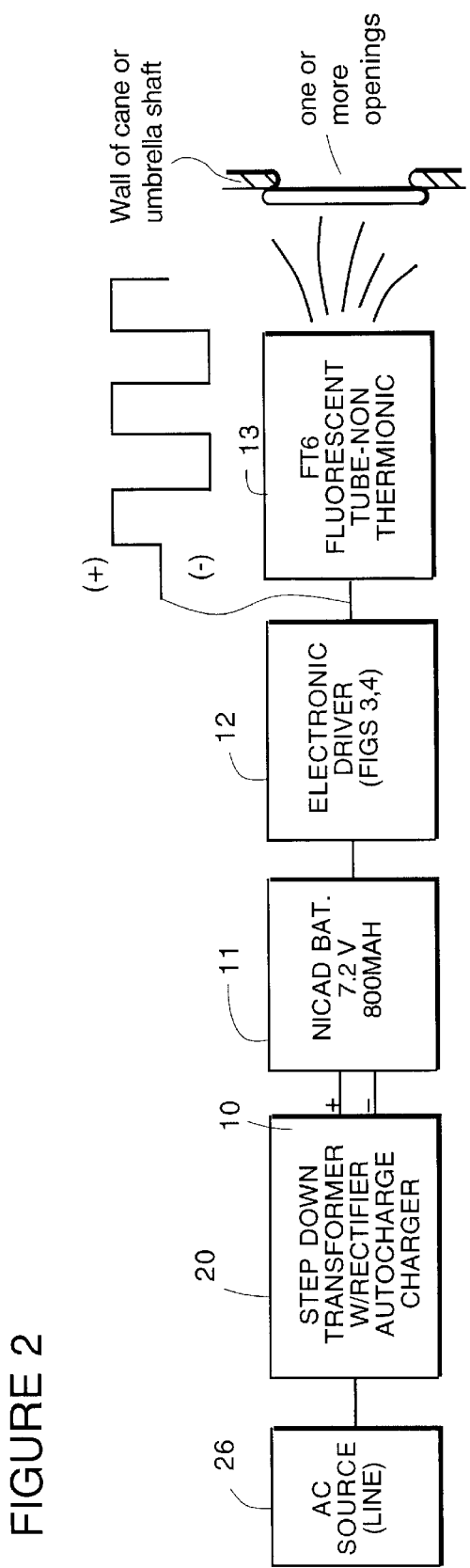
FIG. 2 is a block diagram having a driver circuit incorporating the present invention.
Figure 3:
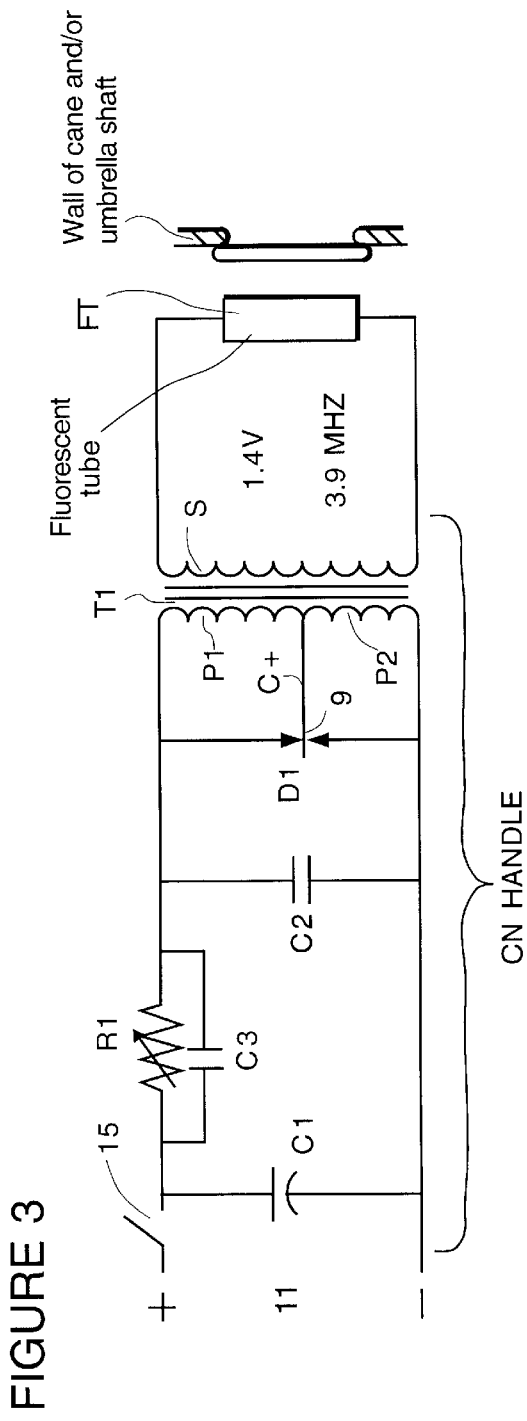
FIG. 3 is a detailed circuit diagram of the driver circuit of the present invention.

In a preferred cane C or umbrella U lighting system, a 7.2 volt DC rechargeable battery 11 is used. The battery backup has a battery charging circuit 10 and uses a 7.2 volt nicad rechargeable battery 11. The charger 10 can use contactless inductive transfer of energy or contact transfer and electrical energy to the battery. The fluorescent tube 13 is selected from FT4, FT6, FT8, etc. fluorescent tube with no starter or ballast and the filaments are not connected to a source of heater current (e.g. the lamp is non-thermionically driven.). The light output in such a lamp is bright and the battery good for three hours. In one embodiment, the cane or umbrella lighting system uses 2.6 watts of energy from a rechargeable battery 11.

In one preferred embodiment, the driver circuit 12 of the present invention includes an oscillating transformer T1 having a primary winding P1, P2 and secondary windings with the primary winding center tapped C and coupled to the toggle or gate electrode of a switching diode D1. A supply of direct current such as a low-voltage battery 11 is applied through switch 15 and electrolytic filter capacitor C1 and a 1500 ohm resistor R1 bypassed by a capacitor C3. A third capacitor shunts the switching diode D1. The circuit operates to provide a 3.9 megahertz alternating square-wave voltage output on the secondary fluorescent tube FT such as FT6. An AC supply is rectified and used to recharge the battery which is mounted in the handle. A charging standard circuit 10, which may use an inductive coupling or a pair of spaced contacts for a rechargeable battery 11 is connected to the AC supply 26.

Figure 4:
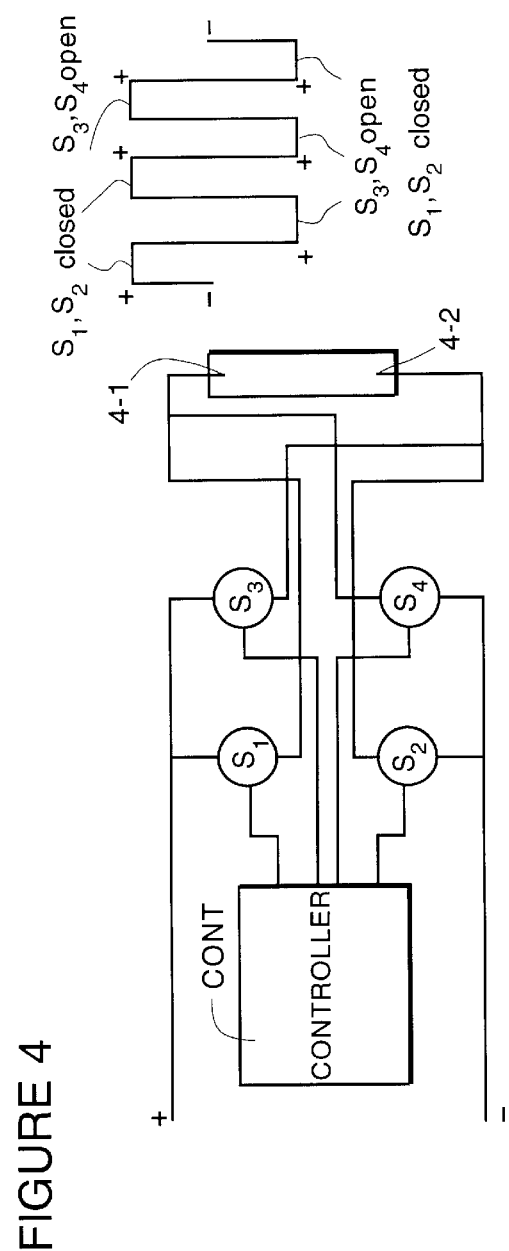
FIG. 4 is a diagrammatic illustration of a transformerless square wave drive circuit of the present invention.

In FIG. 4, direct current from a battery is converted via switches S1, S2, S3 and S4, controlled by controller CONT, to high-frequency square waves as indicated by the AC square-wave drawn to the right and having a frequency of between about 75 kHz and about 4 MHz.

While the invention has been described in relation to preferred embodiments of the invention, it will be appreciated that other embodiments, adaptations and modifications of the invention will be apparent to those skilled in the art.

What is claimed is:

1. A shaft lighting system for canes and umbrellas comprising, in combination, a shaft having one or more openings formed in one or more walls thereof, a fluorescent gas discharge lamp, a source of a high-frequency square-wave voltage having a pair of output terminals and substantially LC-free circuit connecting said high-frequency square-wave voltage to said fluorescent gas discharge to non-thermionically excite and operate said fluorescent gas discharge lamp in a ballast-free manner, and thereby illuminate the area surrounding said shaft.

2. The shaft lighting system defined in claim 1 wherein said voltage is from about 2 volts to about 90 volts and the frequency is from about 75 kHz to about 4 MHz.

3. A cane having a hollow shaft housing with one or more opening thereon, the cane having a lighting system including a fluorescent gas discharge lamp device mounted in said housing, a source of high-frequency, square-wave AC voltage having output terminals and a substantially LC-free circuit connecting said gas discharge lamp device to said output terminals to excite and operate said fluorescent gas discharge lamp device in a ballast-free manner and thereby illuminate said one or more openings.

4. A cane as defined in claim 3 including a source of AC line current, a stepdown transformer connected to said source and having a low AC voltage output, a rectifier connected to said low AC voltage output, a rechargeable storage battery connected to said rectifier and means connecting said low voltage output to said circuit and said rechargeable battery.

5. An umbrella lighting system comprising, in combination a tubular umbrella shaft incorporating a housing having one or more openings formed in one or more walls thereof, a light-producing gas discharge lamp, a source of a high-frequency square-wave voltage having a pair of output terminals and substantially LC-free circuit connecting said low-voltage, high-frequency square wave voltage to said gas discharge means to non-thermionically excite and operate said gas discharge lamp means in a ballast-free manner and thereby illuminate one or more openings.

6. The umbrella lighting system defined in claim 5 wherein said voltage is from about 2 volts to about 90 volts and the frequency is from about 75 kHz to about 4 MHz.

7. The umbrella lighting system defined in claim 5 wherein said umbrella has a flexible rain shield and deflector and spreader mechanism, and wherein said light emitted through said one or more openings illuminate said flexible rain shield and deflector from the interior thereof like the spreader lights on a sailboat.

8. An umbrella lighting system as defined in claim 5 including a source of AC line current, a stepdown transformer connected to said source and having a low AC voltage output, a rectifier connected to said low AC voltage output, a rechargeable storage battery connected to said rectifier and means connecting said low voltage output to said circuit and said rechargeable battery.

* * * * *